United States Patent Office 3,471,331
Patented Oct. 7, 1969

3,471,331
METHOD OF OPERATING FUEL CELL INCLUDING PEROXIDE AND COBALT CONTAINING ELECTROLYTE
Henry George Petrow, Cambridge, Mass., assignor to Prototech Company, division of Bolt, Beranek, and Newman, Inc., Cambridge, Mass., a corporation of Massachusetts
No Drawing. Filed Aug. 9, 1967, Ser. No. 659,297
Int. Cl. H01m 27/00
U.S. Cl. 136—86                                5 Claims

ABSTRACT OF THE DISCLOSURE

The present disclosure is primarily concerned with the discovery of the inprovement in the operation of alkaline media fuel cells and the like effected by the introduction into the cathode region thereof of a source of oxidizable cobalt.

---

The present invention relates to methods of and apparatus for catalytic improvement in the operation of electrochemical cells and the like, being more particularly concerned with the improvement in fuel cell operation involving the application of hydrogen fuel and oxygen or air (hereinafter generically referred to as oxygen) as oxidant.

While the invention is useful in different degrees with different types of alkaline electrolytic media in such applications as electrochemical cells and the like, for purposes of illustration it will be particularly described herein with reference to a preferred type of fuel cell involving elevated-temperature alkaline-metal hydroxides, though it will be understood that the invention is of broader utility. Preferred cells of this type are described, for example, in co-pending application of David Moulton, Robert Novack and Walter Juda, Ser. No. 376,916, filed June 22, 1964, for Fuel Cell Apparatus and Method involving the use of a palladium-containing anode that is only permeable to hydrogen (pure, impure, or reformed from hydrogen and carbon-containing fuels as described, for example, in U.S. Patent No. 3,206,333), a potassium and sodium hydroxide molten anhydrous electrolytic medium maintained at a temperature of about 350°–600° C., and a nickel cathode which may, indeed, comprise the container for the electrolytic medium and into which oxygen may be introduced to assist in action that insures the formation of adequate peroxides and superoxides within the alkaline medium to serve as the oxidant for the fuel cell operation.

It has been found that in cells of this character and other cells, the cathode has a limited capacity for cathodic current density presumably because of the kinetic limitation of superoxides or peroxide formation and/or electrochemical utilization.

In addition, particularly for long periods of continuous use in closed-cell operation, the nickel has a tendency to deposit upon the palladium-containing anode layer and anode surface which decreases the anode performance. Still a further practical difficulty that sometimes arises in continuous use is the tendency for the oxygen inlets to plug with nickel oxide and the like.

A fortuitous discovery underlying the present invention has remarkably obviated all three of the above-described limitations and disadvantages and has introduced improved operation in other particulars, later described. It is, accordingly, an object of the present invention to employ the discovery residing, in summary, in the appropriate addition of an oxidizable cobalt source, to provide a new and improved electrochemical cell and the like of significantly increased cathode current density, and greatly minimize the degree of nickel deposition on the anode and of nickel-oxide plugging of the cathode inlets.

A further object of the invention is to provide a new and improved cathodic method for electrochemical cell operation.

Still a further object is to provide an improved electrochemical cell of more general utility, also.

Other and further objects will be explained hereinafter and will be more particularly set forth in the appended claims.

The invention will now be described in the setting of the illustrative example of the before-mentioned substantially anhydrous molten alkaline-metal hydroxide fuel cell contained within a nickel cathodic housing and provided with a palladium-coating hydrogen permeable and otherwise non-porous anode structure, the cell being operated in the before-mentioned temperature range.

By adding a small amount of a source of oxidizable cobalt in the region of the cell at which oxygen is introduced into the electrolytic medium for producing the formation of peroxide and superoxide oxidant, as described in the said co-pending application, it has been discovered that the before-described limitation in cathodic current density is obviated.

Specifically, in a cell of the above-described character having an anode surface of approximately 57 square centimeters, an effective cathode surface of approximately five times the same, and a potassium-hydroxide sodium-hydroxide molten and substantially anhydrous electrolyte operating at about 475° C., a normal operating point of about 7½ amperes at 0.7 volt can be attained; but attempts to increase the current causes a radical decrease in voltage. An attempt, for example, to increase the current to 9½ amperes will rapidly reduce the voltage to the order of 0.4 volt. This cell operated with a preferred barrier interposed between the anode and cathode, permeable to the ions of the electrolyte, but sufficiently impervious to the transfer of mechanical agitation between the anode and cathode, as described in U.S. application Ser. No. 539,768, filed Apr. 4, 1966, by said Novack, Moulton and Juda for Fuel Cell Process and Apparatus.

If, however, a small amout of oxidizable cobalt is provided in the region of oxygen introduction, it has been found that the exact same cell will readily enable a continuous running point of 9½ amperes at said 0.7 volt. In addition, the discharge curve shows that the current can even be increased to 13 amperes with insignificant reduction in voltage. Thus, at least an increase of 27 to 55 percent in power from the cell is attainable, significantly increasing the available cathodic current density.

For the results above-stated, the source of oxidizable cobalt was in the form of powdered cobalt oxide ($Co_2O_3$) of the order $\frac{2}{10}$ of a percent of the weight of the electrolytic medium. Another suitable source of oxidizable cobalt that has been so used is $Co(NO_3)_2 \cdot 6H_2O$.

At any given temperature, moreover, the amount of electrochemically utilized oxygen is greatly enhanced when this catalytic oxdizable cobalt is added; or, otherwise stated, less oxygen flow input for a given current is required. This reduces the heat-exchange, carbon-dioxide removal and similar requirements of the cell. Slower rate of oxygen input flow, moreover, tends to reduce the rate of possible nickel corrosion. In the above example, the oxygen efficiency of the cell in terms of the percentage of utilization of the supplied oxygen was increased from about 5 to 10 percent to about 15 to 20 percent. Another corollary of this improvement resides in the fact that the same power and efficiency can be obtained at lower temperatures through the use of the additive. While at the higher temperatures, moreover, the catalytic cobalt additive is less needed for peroxide and superoxide formation, its utility for the other purposes abovementioned is highly advantageous.

While the invention is not predicated upon the existence of a correct theory underlying this greatly improved performance, it being sufficient merely to describe the invention in operative form, an explanation for the improvement may reside in the apparent catalytic action of the source of oxidizable cobalt in promoting the further formation and/or electrochemical utilization of peroxides and superoxides in the cathodic regions of the cell by reaction with the oxygen introduced and/or the cathode structure.

Not only has the addition of the source of oxidizable cobalt been found to increase the normally limiting cathode density in such and other cells, but it has been found unexpectedly to inhibit substantially the building up of nickel from the cathode structure upon the palladium or other anode structure, thus enabling long-life and continual operation without degradation of anode performance. Without the invention, for example, some cells show a 20 percent drop-off in anode performance after twenty-four hours of continual operation due to such nickle build-up; whereas in accordance with the present invention, continual operation of thousands of hours has shown no substantial anodic drop due to nickel deposition upon the anode.

Similarly, the normal tendency of nickel oxide to plug the oxygen inlet or tubes introducing the oxygen into the electrolytic medium has simultaneously been found to be greatly minimized over hundreds of hours of operation through the utilization of the oxidizable cobalt, whereas, such plugging can occur within less than a day's operation without the cobalt additive.

Aluminum members, such as washers, supports and the like may be used in closed cells of this character in view of the discovery set forth in the co-pending application of Robert Novack, Ser. No. 376,917, filed June 22, 1964, for Method of and Apparatus for Containing Alkali-Metal Hydroxides and Carbonates, that aluminum, in substantially anhydrous molten electrolytic media of the above-described type, will not be subject to corrosive action so long as the medium is maintained substantially anhydrous. Some water, however, may exist in the electrolyte and this will have a tendency to introduce some corrosion into the aluminum washer or other member. The addition of the cobalt of the present invention has been additionally found fortuitously to produce the formation of a protective deposit about the aluminum member that appears remarkably to protect the same from any small amounts of water that might be present.

As another example, in a cell of the above-described type and electrode dimensions operating with an electrolyte of about 90 percent molten KOH and 10 percent molten NaOH and at a temperature of 455° C., the cell dramatically increased its power output about 64 percent from about 4.2 watts (7.4 amperes, 0.57 volt) to about 7 watts (10 amperes, 0.7 volt) with radical improvement noticeable within a few minutes of the addition of about 1500 milligrams of cobalt nitrate hexahydrate to a value of about 500 grams of the molten electrolyte. The same effect has been produced with an equivalent amount of cobalt added as cobaltic oxide.

As still an additional example, a comparison of molten 90 percent KOH-10 percent NaOH fuel cells of substantially the same cathode area, operated without barriers at about 460° C., one with and one without one gram of cobaltic oxide added to about 500 grams of electrolyte, showed about a three-and-one-half times increase in the power (2.1 watts to 7.56 watts) available with the additive.

While other cathodic additives, such as manganese oxides, have been employed with some cathodic improvement, they have been found to produce an anodic decrease in hydrogen utilization, possibly because of the solubility of the manganese oxides or the like. It has been discovered, however, that cobalt oxides unlike manganese oxides do not introduce this anodic decrease in hydrogen utilization.

While the invention has been described in connection with the preferred sodium and potassium molten electrolytic media and palladium and nickel electrodes and the like, it will, of course, be evident that other materials may be employed and that the invention may also be used with other types of cells or structures in which similar problems exist and in which one or more of the beneficial features introduced by the addition of the oxidizable cobalt are desired.

Experiments have shown that the addition of more than about a maximum of one percent of the oxidizable cobalt is unnecessary to achieve the purposes of the invention and suitable improvement; but an alternative, though perhaps more costly, modification may involve the use of a cobalt cathode or other structure which itself will serve as a source of oxidizable cobalt for a similar purpose. Further modifications will occur to those skilled in this art and all such are considered to fall within the spirit and scope of the invention as defined in the appended claims.

What is claimed is:

1. A method of operating a fuel cell containing an alkali-metal hydroxide electrolytic medium, that comprises maintaining the medium at a temperature in excess of about 350 degrees C. and sufficient to render the medium molten and substantially anhydrous and in contact with an oxygen-containing atmosphere in an amount sufficient to provide in the medium at least one of alkali-metal peroxide and superoxide, said peroxide and superoxide functioning as substantially the sole fuel cell electrochemical oxidant, applying hydrogen-containing fuel to the fuel cell, introducing a source of oxidizable cobalt into the said medium, and drawing current from said fuel cell while holding the said medium at such temperature and while utilizing said oxidant electrochemically to provide substantially the entire current output of the fuel cell.

2. A method as claimed in claim 1, in which said medium is disposed between an anode and a cathode, and further comprising feeding an oxygen-containing gas into said medium in the region of the cathode, said source being of sufficient percentage of the volume of the said medium to promote at least one of the formation electrochemical utilization of peroxides and superoxides in said region by reaction with oxygen.

3. A method as claimed in claim 1, in which the percentage of cobalt in said medium is of the order of less than about 1%.

4. A method as claimed in claim 1, in which the oxidizable cobalt comprises one of cobalt oxides and cobalt nitrates.

5. A method as claimed in claim 1, in which the medium is maintained at a temperature in excess of about 400 degrees C.

References Cited

UNITED STATES PATENTS

| 3,026,364 | 3/1962 | Jackson et al. | 136—86 |
| 3,134,698 | 5/1964 | Neipert et al. | 136—86 |
| 3,280,014 | 10/1966 | Kordesch et al. | 136—86 |
| 3,393,099 | 7/1968 | Giner et al. | 136—86 |

ALLEN B. CURTIS, Primary Examiner

U.S. Cl. X.R.

136—154